United States Patent [19]
Moon

[11] Patent Number: 5,541,647
[45] Date of Patent: Jul. 30, 1996

[54] EXTERNAL DATA READ/WRITE CIRCUIT

[75] Inventor: Kyoung-ho Moon, Songnam, Rep. of Korea

[73] Assignee: Samsung Electronics Co., Ltd., Kyungki-do, Rep. of Korea

[21] Appl. No.: 433,059

[22] Filed: May 3, 1995

[30] Foreign Application Priority Data

Jun. 9, 1994 [KR] Rep. of Korea .................. 94-12947

[51] Int. Cl.⁶ .................................................. H04N 5/44
[52] U.S. Cl. ........................ 348/180; 348/184; 348/553
[58] Field of Search ................................ 348/180, 184, 348/190, 725, 559, 560, 561, 562, 734, 553, 231, 232, 729, 177, 178, 181, 567, 714, 563, 718, 719, 720; 364/705.05, 550, 551.01, 571.04; 235/380, 381, 375; 345/904, 134; H04N 5/44

[56] References Cited

U.S. PATENT DOCUMENTS 5,325,196  6/1994  Yoshimi et al. .................. 348/180

FOREIGN PATENT DOCUMENTS

| 0211554 | 2/1987 | European Pat. Off. ......... H04N 5/44 |
| 0407791 | 1/1991 | European Pat. Off. ......... H04N 5/44 |
| 3435697 | 4/1986 | Germany .............................. 235/381 |

*Primary Examiner*—Safet Metjahic
*Assistant Examiner*—Nina N. West
*Attorney, Agent, or Firm*—Sughrue, Mion, Zinn, Macpeak & Seas

[57] ABSTRACT

An external data read/write circuit has a jack including serial clocks, serial data, bus stop, and power source lines installed on a television set and an external service card for writing corresponding area information into a memory of the television via a serial data line when an information transmission key input and a corresponding area code are received from the external service card, and for reading out information required for fault diagnosis from the television when a fault diagnosis key input is received to display the result on a display apparatus of the external service card, thereby writing information needed by a user into a memory or integrated circuit within the television and reading out fault information of the television.

3 Claims, 3 Drawing Sheets

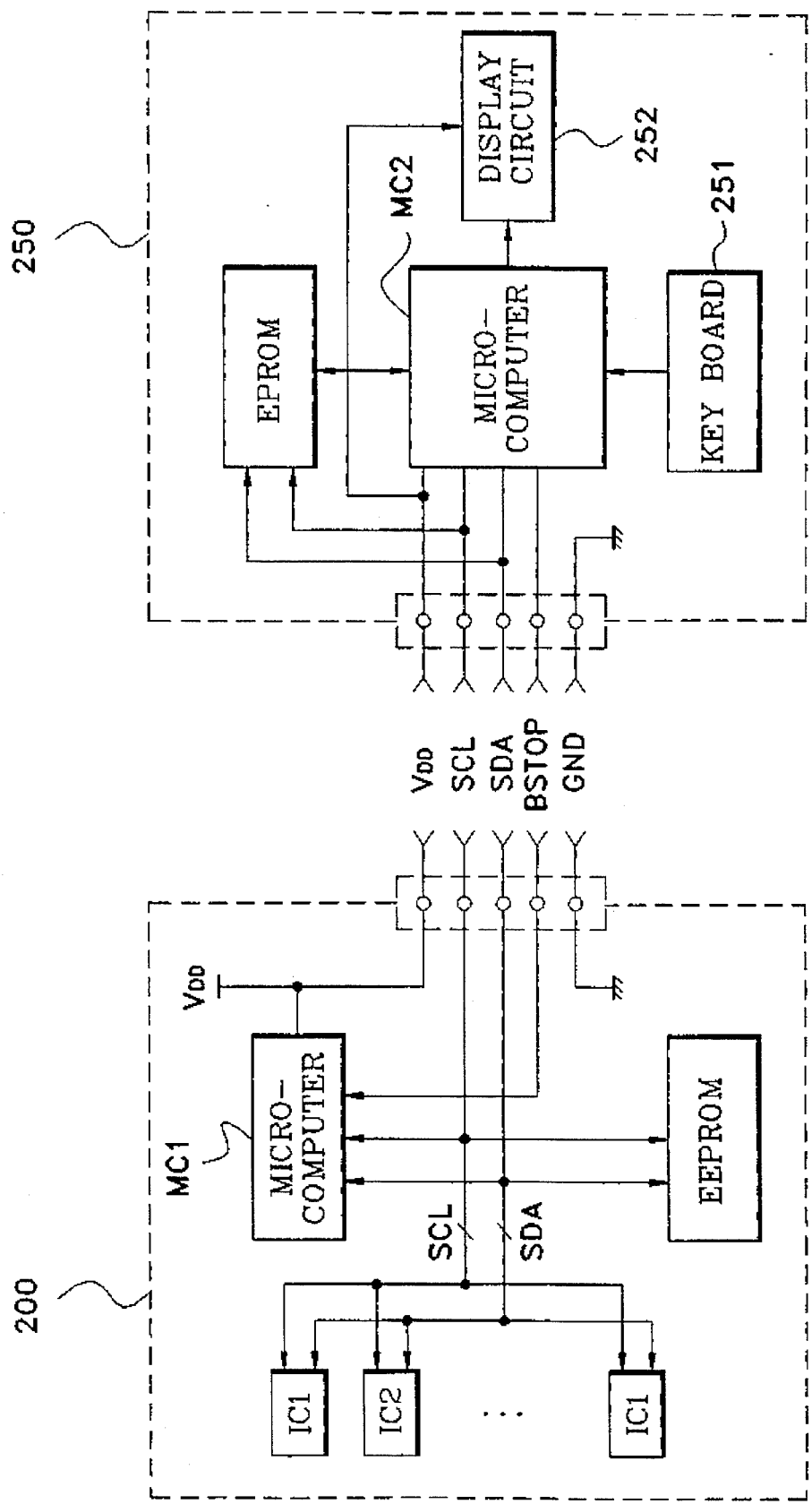

EXTERNAL DATA READ/WRITE CIRCUIT

BACKGROUND OF THE INVENTION

1. Field of the Invention

The present invention relates to an external data read/write circuit, and more particularly to an external data read/write circuit, wherein a jack having serial clocks, serial data and bus stop lines is installed on a television which has a bus controlling system with a non-volatile memory. The present invention also relates to an external service card which is connected to the jack for writing information desired by a user into the non-volatile memory or into an integrated circuit within the television and reading out fault information of the television.

2. Description of the Prior Art

As the number of integrated circuits (ICs) employed within household electronic appliances such as televisions has increased to upgrade the appliances and to achieve more functions, a trend has developed to widely adopt a bus system (e.g., 2-wired 12C bus) for data exchange and data transmission between ICs.

Such a bus system not only allows a significant reduction of peripheral components, including a low-pass filter for a television, but also allows the manufacturing process to be automatically controlled by a computer to increase productivity.

Japanese Laid-open Publication No. 3-107283, entitled: "Portable Television with a Picture Information Display Function", discloses a technique whereby a predetermined program is stored in an IC card, and picture information of an image information circuit for generating picture information is selected to be displayed by a video signal of a television or by the program of the IC card upon pressing a selection key.

In more detail, the above Japanese Laid-open Publication No. 3-107283 includes a television circuit for receiving and demodulating a television signal, a detachable semiconductor memory device for storing a predetermined program together with a predetermined I/O terminal, and an image information circuit having a terminal which connects to the detachable memory device for generating predetermined picture information based upon the program read out from the memory device. In addition, there is provided a selection unit for selecting a television video signal of the television circuit or the picture information of the image information circuit, a display portion for displaying a picture based upon the video signal selected in the selection unit, and a stop unit interlinked with the selection unit for halting the operation of the image information circuit or television circuit. Therefore, the image information of the image information circuit that generates the picture information by the video signal of the television or program stored in the IC card, is selected to be displayed to improve the functioning of the portable television.

The above-described technique can selectively display the video signal of the television or picture information stored in the image information circuit by accommodating the program for generating the picture information of the image information circuit stored in the IC card in the television. However, data exchange and transmission between the television and external card cannot be carried out.

SUMMARY OF THE INVENTION

The present invention is directed to solve the above-described problems. Accordingly, it is an object of the present invention to provide an external data read/write circuit in which an external service card is separately connected to a television before delivering the product from a factory, or before selling it. Data such as that associated with broadcasting channels available in the geographic area, on-screen display (hereinafter referred to as "OSD") designation of broadcasting station names of respective channels, telephone numbers of after-service centers and main area codes which are useful for a user are easily stored into a non-volatile memory within the television, thereby enhancing convenience of the user.

It is another object of the present invention to provide an external data read/write circuit for reading out and writing data required by a serviceman for repairing a problem with the television trouble. Date is read and written using an external service card without opening the television, thereby reducing the cost and time involved in troubleshooting.

To achieve the above object of the present invention, there is provided an external data read/write circuit including a television set which has a jack including serial clocks, serial data, bus stops, and power source lines projecting from the outer portion thereof, and an external service card which has a jack including serial clocks, serial data, bus stops, and power source lines detachable from the television set, so as to write information corresponding to a specific geographic area into a memory of the television set via a serial data line when an information transmission key input and a corresponding area code are received, and so as to read out information required for fault diagnosis from the television set when a fault diagnosis key input is received to display the required information on a display apparatus.

BRIEF DESCRIPTION OF THE DRAWINGS

The above objects and other advantages of the present invention will become more apparent by describing in detail preferred embodiments thereof with reference to the attached drawings in which:

FIG. 2 is a block diagram showing an external data read/write circuit according to the present invention.

DETAILED DESCRIPTION OF THE PREFERRED EMBODIMENT

Figure 1A:
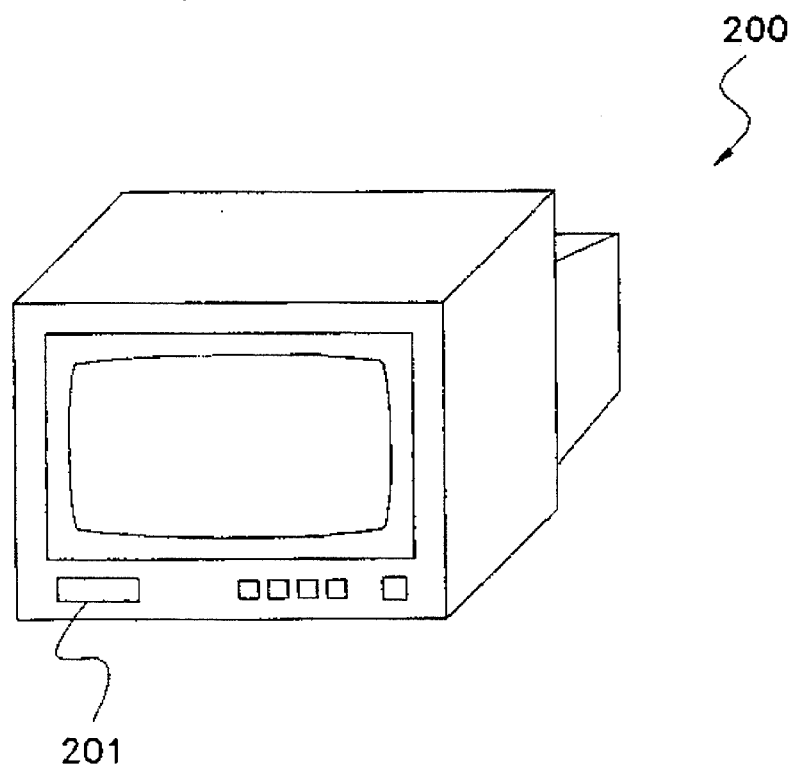
FIGS. 1A and 1B are perspective views respectively showing one embodiment of a television set for reading/writing external data and an external service card according to the present invention.
Figure 1B:
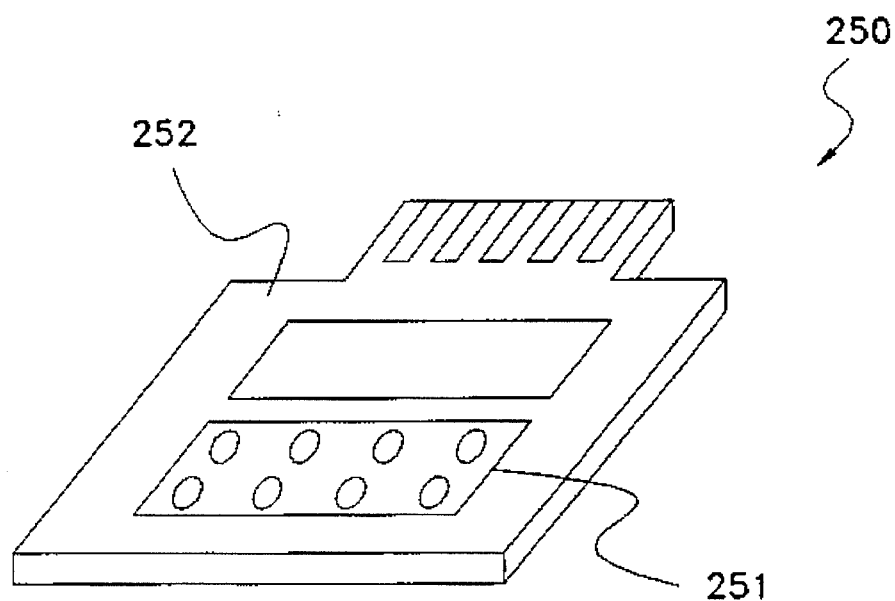

One embodiment of the present invention having a television set connected with an external service card and an external service card for external data read/write circuit will be described with reference to FIGS. 1A and 1B.

Reference numeral 201 designates a slot as an inlet and outlet for an external service card 250. The slot is provided with a jack including serial clocks SCL for data reading/writing along with the external service card 250, serial data SDA, bus stop BSTOP, and power source lines VDD and GND. The external service card 250 has a jack including the serial clocks SCL, serial data SDA, bus stop BSTOP, power source lines VDD and GND.

Referring to FIG. 2 which shows the external data read/write circuit according to the present invention, reference numeral 200 schematically illustrates components of a television having a 2-wired 12C bus, and 250 illustrates the external service card which is detachable from the television.

In FIG. 2, the jack, including the serial clocks SCL, serial data SDA, bus stop BSTOP and power source lines VDD and GND, is installed in the slot 201 of the television body.

The external service card 250 is also equipped with a jack including the serial clocks SCL, serial data SDA, bus stop BSTOP and power source lines VDD and GND.

The television set 200 has a plurality of slave ICs (IC1 to ICN) for processing and storing data, a non-volatile memory such as an electrically erasable programming ROM (hereinafter referred to as 'EEPROM') for storing all data controlling the television and slave IC control data, and a main microcomputer MCI for controlling the slave ICs ICI to ICN and the memory EEPROM in accordance with the serial clocks SCL and serial data SDA.

The external service card 250 has a keyboard 251 provided with various keys for transmitting and reading out data, and a display circuit 252 formed of 7-segment light emitting diodes for displaying the result of an internal diagnosis of the television. Additionally, an EPROM stores required information, according to geographic area, and a sub-microcomputer MC2 transmits bus stop data when a start key input for initiating data transmission is received from the keyboard 251 to convert the television mode from a master mode to a slave mode, thereby controlling all the ICs of the television.

Figure 3:
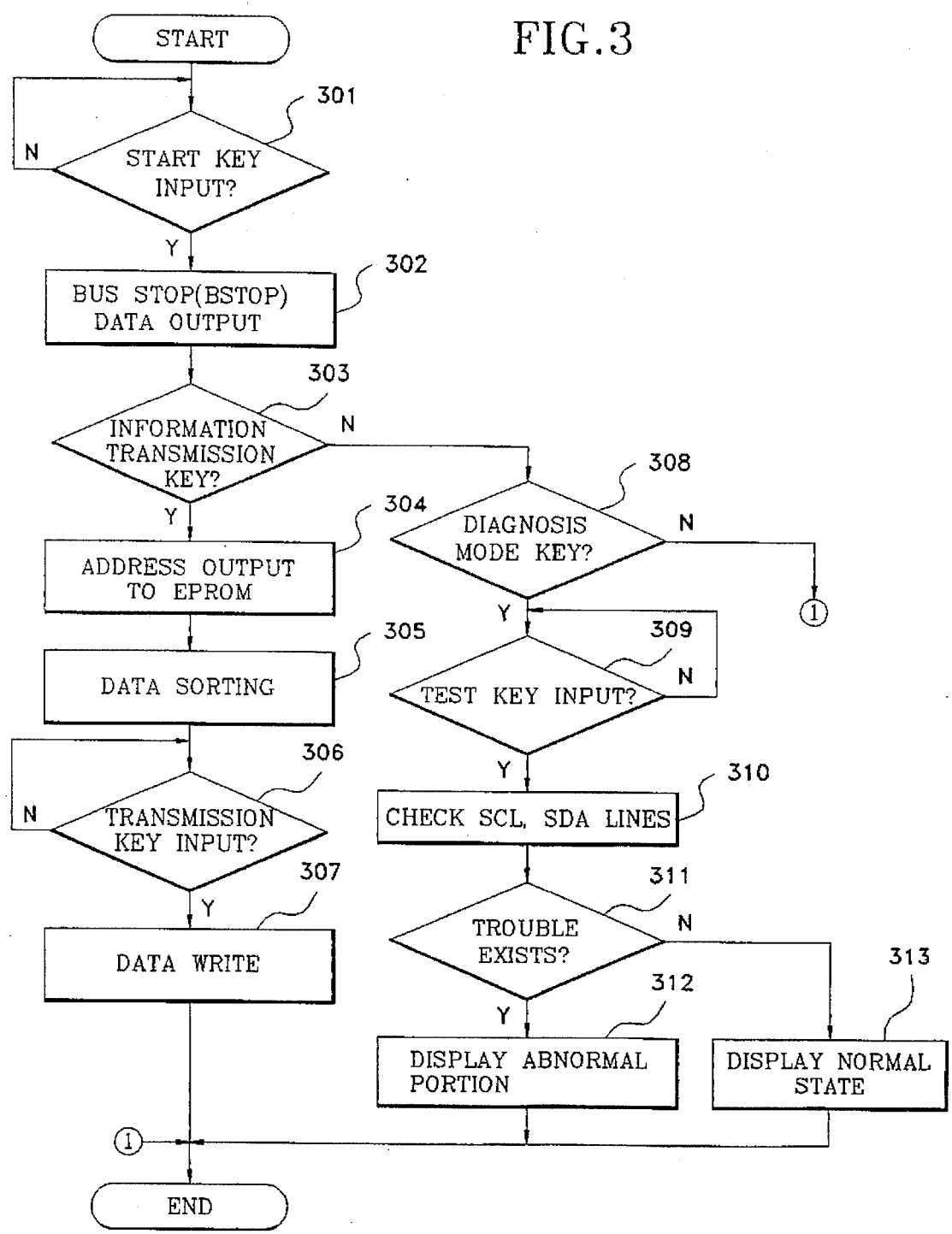
FIG. 3 is a flow chart for performing external data read/write function according to the present invention.

FIG. 3 is a flow chart for explaining the operation of the external data read/write circuit according to the present invention.

The present invention constructed as above will be described with respect to the use of the external service card to store data and diagnose a television fault.

The external service card 250 as shown in FIG. 2B is inserted into the slot 201 of the television, and the television is turned on. The start key of the key board 251 on the external service card 250 is pressed (step 301).

When the start key input is received, the external service card 250 transmits the bus stop data to the television set 200 to make the bus stop data line BSTOP low (step 302). Then, the main microcomputer MCI of the television set 200 converts the television mode from the master mode to the slave mode for reading and writing data.

Accordingly, the sub-microcomputer MC2 of the external service card 250 serves as a master microcomputer for controlling all the ICs IC1 to ICN of the television set 200. At this time, if the information of the corresponding area is desired to be written into the memory EEPROM in the main microcomputer MCI, an information transmission key is pressed (step 303), and the corresponding area code allotted for each region is input by means of the keyboard 251. By this manipulation, the sub-microcomputer MC2 of the external service card 250 supplies an address, which contains information corresponding to a geographic area, to the EPROM (step 304) so as to read out only the corresponding information among various data prestored in the EPROM (step 305).

When the information transmission key input is received via the keyboard 251 (step 306), the corresponding data is written into the memory EEPROM in the television from the EPROM of the external service card 250 through the serial data line SDA (step 307). The corresponding information denotes the broadcasting channels available in that area, OSD designation of broadcasting station names of respective channels, telephone numbers of after-service centers and main area codes, all of which have been previously provided in the memory EPROM of the external service card 250 according to geographic area. Therefore, a user can easily display desired information on the television with a simple manipulation.

Meanwhile, if a fault diagnosis is to be performed on the television, a diagnosis mode key is pressed (step 308) and a test key is manipulated (step 309). By the key manipulation, the sub-microcomputer MC2 of the external service card 250 checks the serial clock SCL line and serial data SDA line to search out trouble in the television (step 310). If it is determined that a trouble occurs in the television (step 311), an abnormal indication is displayed on the display circuit 252. Otherwise, the normal state is displayed on the display circuit 252 (step 313).

As a result, even without opening the case of the television, a serviceman or the user can easily check any IC fault within the television, any peripheral component troubles, total television usage time, an OSD of a test signal pattern required for repairing the television, a serial number, and normal operation of the main microcomputer MCI.

By an external data read/write circuit according to the present invention as described above, a jack, including serial clock and serial data lines, is installed on a television having a bus-controlling system, and an external service card is connected to the jack to write or read out required data on the television. Thus, information specific to the geographic area or other information convenient to a user which must otherwise be separately manipulated to be stored in the television is easily stored to provide convenience to the user. Also, a serviceman can easily read out fault information without opening the television case during repairing, and information management such as mathematical data totalization can be quickly handled, thereby reducing the cost and time necessary for repairing the trouble in the television.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. An external data read/write circuit comprising:

a television set having a jack including serial clocks, serial data, bus stop, and power source lines; and an external service card having a jack including serial clocks, serial data, bus stop and power source lines attachable to and detachable from said television set, for writing corresponding area information into a memory of said television set via a serial data line when an information transmission key output and a corresponding area code are received, and for reading out information required for fault diagnosis from said television set when a fault diagnosis key output is received to display the required information on a display apparatus.

2. An external data read/write circuit as claimed in claim 1, wherein said external service card comprises:

a keyboard provided with various keys for writing data into and reading data out of the television set;

a display portion for displaying the result of a diagnosis of said television set;

a memory for storing information necessary corresponding to a geographic area; and a sub-microcomputer for transmitting bus stop data when a start key input for starting data transmission is received from said keyboard to convert a mode of the television from a master mode to a slave mode, and controlling all ICs of said television.

3. An external data read/write circuit as claimed in claim 2, wherein said display portion is formed of at least one 7-segment light emitting diode.

* * * * *